(12) United States Patent
Ling

(10) Patent No.: US 6,526,402 B2
(45) Date of Patent: Feb. 25, 2003

(54) SEARCHING PROCEDURES

(75) Inventor: James Richard Ling, Galleywood (GB)

(73) Assignee: One-Stop.To Limited (GB)

( * ) Notice: Subject to any disclaimer, the term of this patent is extended or adjusted under 35 U.S.C. 154(b) by 216 days.

(21) Appl. No.: 09/732,947

(22) Filed: Dec. 8, 2000

(65) Prior Publication Data

US 2002/0059192 A1 May 16, 2002

(30) Foreign Application Priority Data

Oct. 27, 2000 (GB) .............................................. 0026285

(51) Int. Cl.[7] .............................................. G06F 17/30
(52) U.S. Cl. ............................ 707/3; 707/10; 707/103
(58) Field of Search .................... 707/1–3, 10, 102–103

(56) References Cited

U.S. PATENT DOCUMENTS

| | | | | | |
|---|---|---|---|---|---|
| 5,121,475 | A | * | 6/1992 | Child et al. ................... | 707/507 |
| 5,159,552 | A | * | 10/1992 | van Gasteren et al. ......... | 704/1 |
| 5,555,354 | A | * | 9/1996 | Strasnick et al. ............. | 345/427 |
| 5,715,444 | A | * | 2/1998 | Danish et al. .................. | 707/4 |
| 6,006,225 | A | * | 12/1999 | Bowman et al. ................ | 707/5 |
| 6,038,668 | A | * | 3/2000 | Chipman et al. ............ | 713/201 |
| 6,173,422 | B1 | * | 1/2001 | Kimura et al. ................. | 714/57 |
| 6,292,794 | B1 | * | 9/2001 | Cecchini et al. ............... | 707/3 |
| 6,324,534 | B1 | * | 11/2001 | Neal et al. ...................... | 707/3 |
| 6,345,322 | B1 | * | 2/2002 | Humphrey .................... | 710/38 |
| 6,353,822 | B1 | * | 3/2002 | Lieberman ..................... | 707/3 |
| 6,377,945 | B1 | * | 4/2002 | Risvik ............................ | 707/3 |
| 6,381,607 | B1 | * | 4/2002 | Wu et al. ................... | 707/100 |

* cited by examiner

Primary Examiner—Safet Metjahic
Assistant Examiner—Hanh Thai
(74) Attorney, Agent, or Firm—Renner, Kenner, Grieve, Boback, Taylor & Weber

(57) ABSTRACT

A searching procedure, particularly for searching on the Internet, using a search engine associated with a database and comprising submitting a request string comprising a locator (or URL) for the search engine and a search string including at least one search term. This will be an invalid address so an error signal is generated, and the generation thereof is monitored and used to trigger parsing of the request into the locator and the search string. The search string is then submitted to the search engine having the specified locator; and the data returned from the search engine is passed back to the user. The invention also includes a computer readable medium and a set of application program interfaces on such a medium for use in effecting the above procedure. The invention allows convenient searching from a command line.

23 Claims, 4 Drawing Sheets

SEARCHING PROCEDURES

The present invention relates to a procedure for searching a database (as hereinafter defined) having a search engine associated therewith. The invention is particularly directed to a method for Internet and intranet searching.

The practice of Internet and intranet searching is well known for both business and private use. Various methods are used to conduct these searches and these generally require a user to access the web-site of a chosen search engine, enter the search terms in the appropriate fields using the search engines' specific syntax, and then visually to sort the frequently huge quantities of results that are returned. These traditional methods suffer from a requirement for an unnecessary amount of user input and steps. What is more they generate large amounts of uncontrolled, spurious and unrelated information along with the desired search results. These failings make traditional search engines both time consuming and hard to use therefore making it difficult to locate the information required.

When accessing a search web-site, or indeed the Internet in general, a user utilises a type of program called a browser, which acts as an interface with the Internet or other computer network. Common examples of such browsers include Microsoft® Internet Explorer® and Netscape Navigator®.

An object of the present invention is to permit searching in a fashion more seamless to the a user. Such a searching procedure could be quicker but and have fewer steps actually to be performed by a user. In addition, a further preferred object is to ease the process of searching so as to limit the results to exclude the majority of, if not all, extraneous material.

According to the present invention there is provided a database searching procedure using a search engine associated with that database and comprising the steps of:

submitting a request string comprising a valid pointer to a specified search engine and a search string for specified data;

monitoring for the generation of an error signal, from the search engine;

using the error signal to trigger parsing of the request string into the pointer to the search engine and the search string to be searched by the search engine;

submitting the search string to the search engine; and passing at least some of the returned data returned from the search engine, back to the user.

When the procedure according to the present invention is intended to search on the Internet, the pointer will generally comprise the Uniform Resource Locator (URL) of the chosen search engine. Therefore according to the present invention there is also provided a database searching procedure using a search engine associated with that database comprising the steps of:

submitting a request string comprising the URL of the search engine and a search string for specified data comprising at least one search term;

monitoring for the generation of an error signal from the search engine;

using the error signal to trigger parsing of the request string into the search engine's URL and the search string;

submitting the search string to the search engine having the specified URL; and passing at least some of the returned data returned from the search engine, back to the user.

As the present invention is primarily intended to search databases on the Internet, the searching procedure is preferably carried out by a program or programming steps running on computer apparatus. In such a situation, the request string may be submitted by a first computer with the database maintained on a second computer in communication with the first computer. The error signal may comprise an error code or message.

As used herein the term database refers to the data source from which the search engine retrieves data to be returned to the user. Such database could include, but is not limited to, conventional relational tables, lists of links or files, flat files etc. Similarly the term search engine as used herein includes any program or computer with a predominate searching functionality, not just a conventional Internet search system. For example the present invention could be used to search on an intranet for work files, and in such an instance the search engine could be a cross network searching program, and the database could be lists of files.

It is specified above that the search engine returns the request string to the user. The search engine may do this directly or may include web server software, which software is actually responsible for this task. The web server software may run on a separate but associated computer, or may be integrated with the searching software of the search engine, but the term search engine specified above is taken to include such web server software if present.

Preferably, this invention provides a procedure for searching that allows search criteria to be entered in the address or location field of an Internet or intranet browser (as hereinbefore described), as if it was a normal Internet or intranet address (or URL).

The programming steps may be performed on the first computer; or on the second computer; or on a third computer in the path of communication between the first and the second computers. If the programming steps are performed on the first computer they may be part of the browser software, or may be a separate program, working in co-operation therewith. If the procedure is performed by programming steps on the second computer, it could form part of the control mechanism of the search engine. If the procedure is performed by a third computer in the path of communication between the first and the second computers, such a computer could be a net server, the server of an Internet (or Independent) Service Provider (ISP), or perhaps a gateway or portal machine associated with the provider of the search engine, and through which the search engine is interrogated.

More than one search term may submitted as part of the search string. Logical operators, truncation and "wild-card" characters and any other searching phraseology may also be incorporated in or with the search terms. In this way more complex or specific searches may be conducted.

Before the returned data is passed to the user, it is preferred that the data under goes some form of handling or processing. Such further handling or processing could included at least one of sorting, categorising, screening, filtering, forwarding etc.

For example a system running a method according to the present invention could be set to filter by date, so as to provide only relevant and up to date information. Alternatively it could be used to remove adult oriented material or redundant links. The possibilities for the range of filters that could be applied are almost endless and could be tailored for specific groups of customers such as businesses, government, children, adults etc.

When a user submits a search, the search string may be entered in a predetermined standardised format, as this allows ease of use (i.e. no need to carefully consult a instructional guide on every occasion) as well as permitting integration across a number of different search engines. Alternatively, the format may be specific to one or an group of search engines. Standardisation means that different search engines may be consulted with only the need to change the URL to that of the chosen engine. The syntax covering logical operators, truncation characters and "wildcards" (a symbol that could represent anything) may also be standardised.

Preferably, the trapping and subsequent manipulation of the standard error message and handling of data returned from the search engine should be handled by a Common Gateway Interface (CGI) program or another open systems compliant practice. However, other non specified proprietary methods could be used.

It is highly preferable that the searching procedure according to the present invention operate between a user on a p.c. and a search engine web-site available via the Internet. In such an arrangement, the user would enter the request string in the address line of the browser being used. The browser would then attempt to access the page of the web-site specified by the request string, but as the page address is invalid overall, an error message is generated. This error message is then trapped either on its return to the user's computer or at the location of the search engine (or indeed at an intermediate point). Trapping of the error message initiates the completion of the remaining procedure steps. Once completed the results are then displayed in the browser that the user is utilising. In this way, a user will need only to enter the request string and then await the return of the duly processed results. Consequently, the process of searching is significantly simplified from the point of view of the user.

In order that it may be better understood, and by way of example only, the present invention will be described with reference to the accompanying drawings in which.

FIG. 4 has 3 parts, A B and C, and they show 3 basic arrangements for the communication between the user the CGI or program and the search engine.

Figure 1:
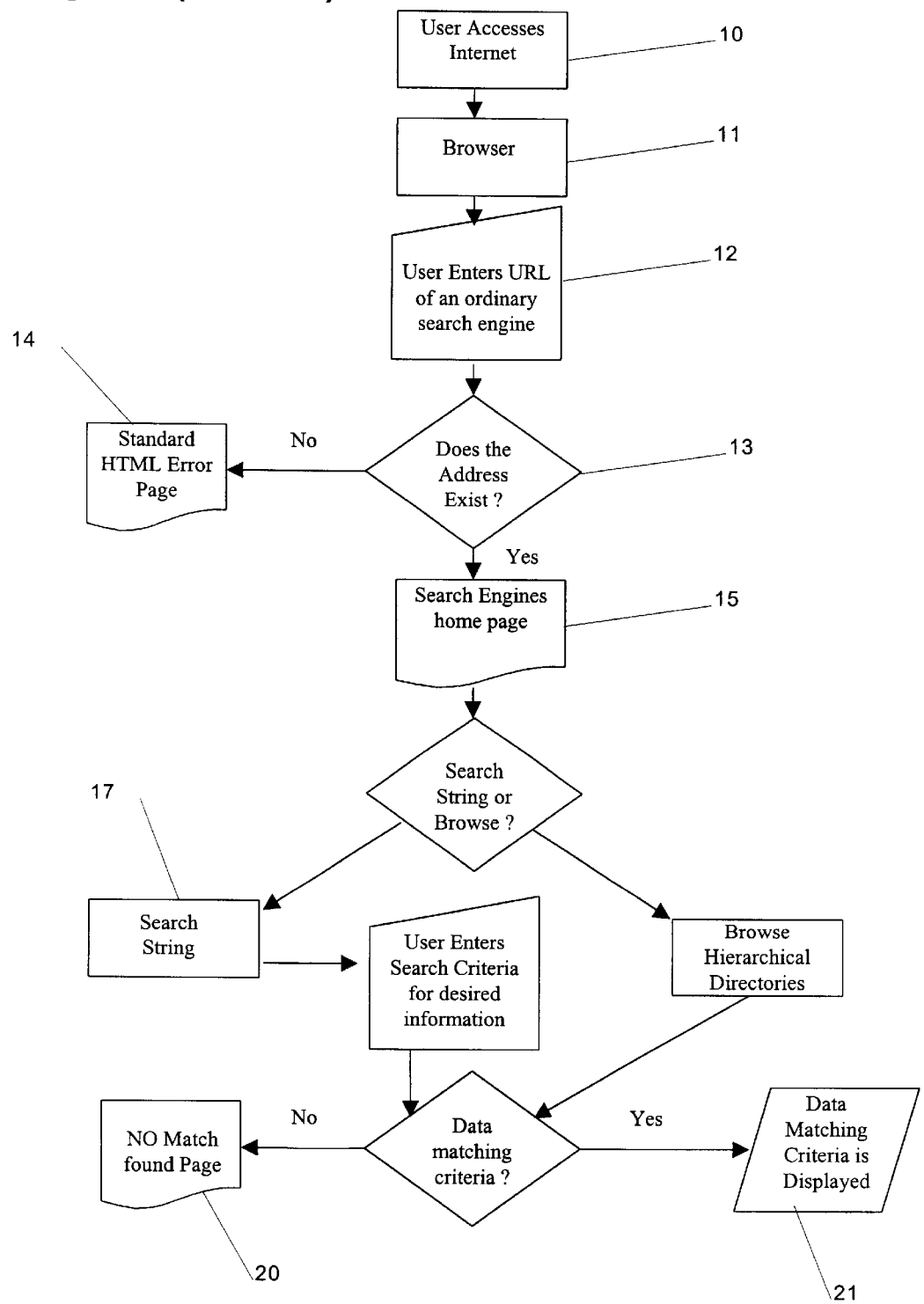
FIG. 1 is flow diagram showing existing search methodology employed.

As shown in FIG. 1, the existing method of searching on the Internet and intranet commences by accessing the Internet or intranet, possibly via an Internet Service Provider (ISP), at step 10. The user then uses a browser 11 (as hereinbefore described), to enter the web address (URL) of a traditional search engine home page (e.g. www.yahoo-.com™ or www.dogpile.com™) at step 12.

The browser in combination with other information sources on the Internet attempts to locate the specified page at step 13. If the web address entered at 12 does not exist, then an error page 14 is displayed. The error page 14 is either the default one, supplied with the web server or browser software or a specific generated page stating that the address entered at step 12 does not exist. If, however the address is valid then the home page of the search engine 15 is displayed.

The home page of the search engine 15 generally consist of three types of information; advertising information such as banners; a hierarchical directory structure that can be manually traversed to try to find the information; and an input field or fields where the user can enter a search string on which to base their search.

In order to locate the information, a user at step 16 selects the searching method required, i.e. either the entry of a search string at 17 or traversing the directory structure at 18. If a user chooses to enter a search string at 17 the search engine uses the information to search its database and to find any matching entries. If there are no matching entries then a standard page 20 is displayed saying there was no match found. Alternatively if the user decided to traverse the directory structure and there is no matching entry in the lowest level directory, the directory either shows as empty or a matching entry will not be visible in the available sub-directories.

If a search string entered at 17 is matched in the database then raw unprocessed data will be displayed at step 21. The data is also displayed at 21 if there is a matching entry when a user decides to traverse the directory structure.

Figure 2:
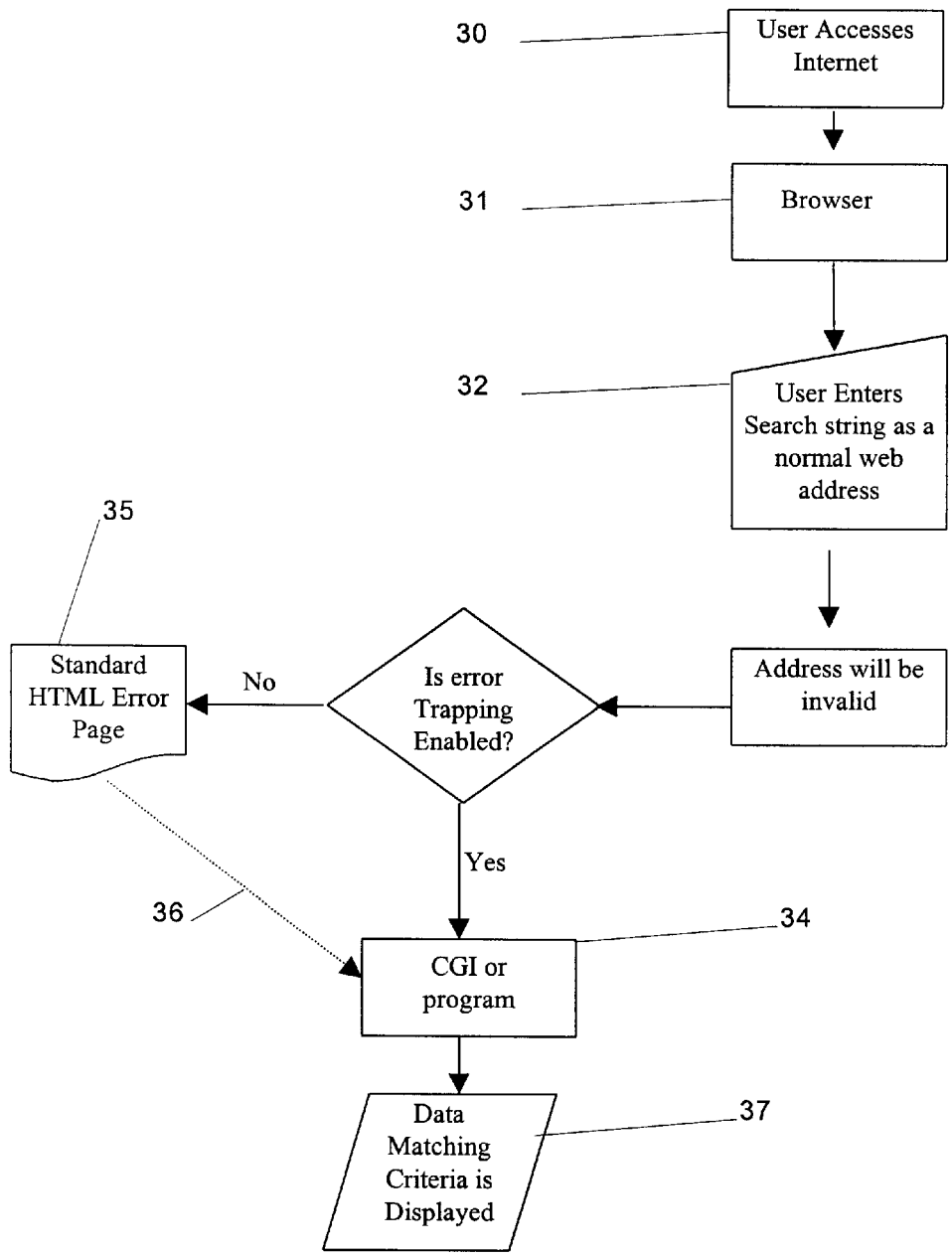
FIG. 2 is a flow diagram showing the overall method of the present invention.

As shown in FIG. 2, the invention provides a new technical method of searching on the Internet and intranet. This process commences in the same way as the prior art method, by the user firstly logging on to the Internet or intranet at step 30 and using a browser 31. However, in the present invention, the user enters a search string as if it were a sub-page of a traditional web address at step 32, with the URL of the search engine and the search string as a composite (e.g. www.searchengine.com/search string). The browser 31 is then instructed to locate the page, (usually by hitting the enter key or other appropriate button).

The URL does not actually specify a valid Internet address because the sub-page of the search engine does not exist—the syntax is deliberately invalid. Such a non-existent address will force an error message such as is generated in step 14 of the prior art method, which message is intended to be returned to the user. However, in the present invention, this error message is instead "trapped" or in other words its generation is noted, and it is prevented from being returned to a user. Instead a CGI or other program is initiated at step 34 in response to trapping of the error message. However, if a method according to the present invention is not being used, or a program implementing such a method is not activated or present, then the error is not trapped and a standard error page 35 will be displayed on the user's computer. Step 34 will be described in more detail with reference to FIG. 3.

The error handling and technical processing CGI or other program activated could either be invoked automatically when the error is trapped, by replacing the standard error page 35 with a CGI or program 34 of the same file name. Alternatively the CGI or other program could be invoked by being called by a reference in the standard error page (dotted line 36).

The infrastructure of the invention is defined by the features and functionality included in the CGI or other program 34. It is at this stage that the raw results yielded by the raw search are subject to whatever filter processes and acceptance criteria that the owners of the search engine decide to implement—this is further described with reference to FIG. 3. The refined data is then displayed at step 37, possibly according to criteria specified by the search engine or the user.

Figure 3:
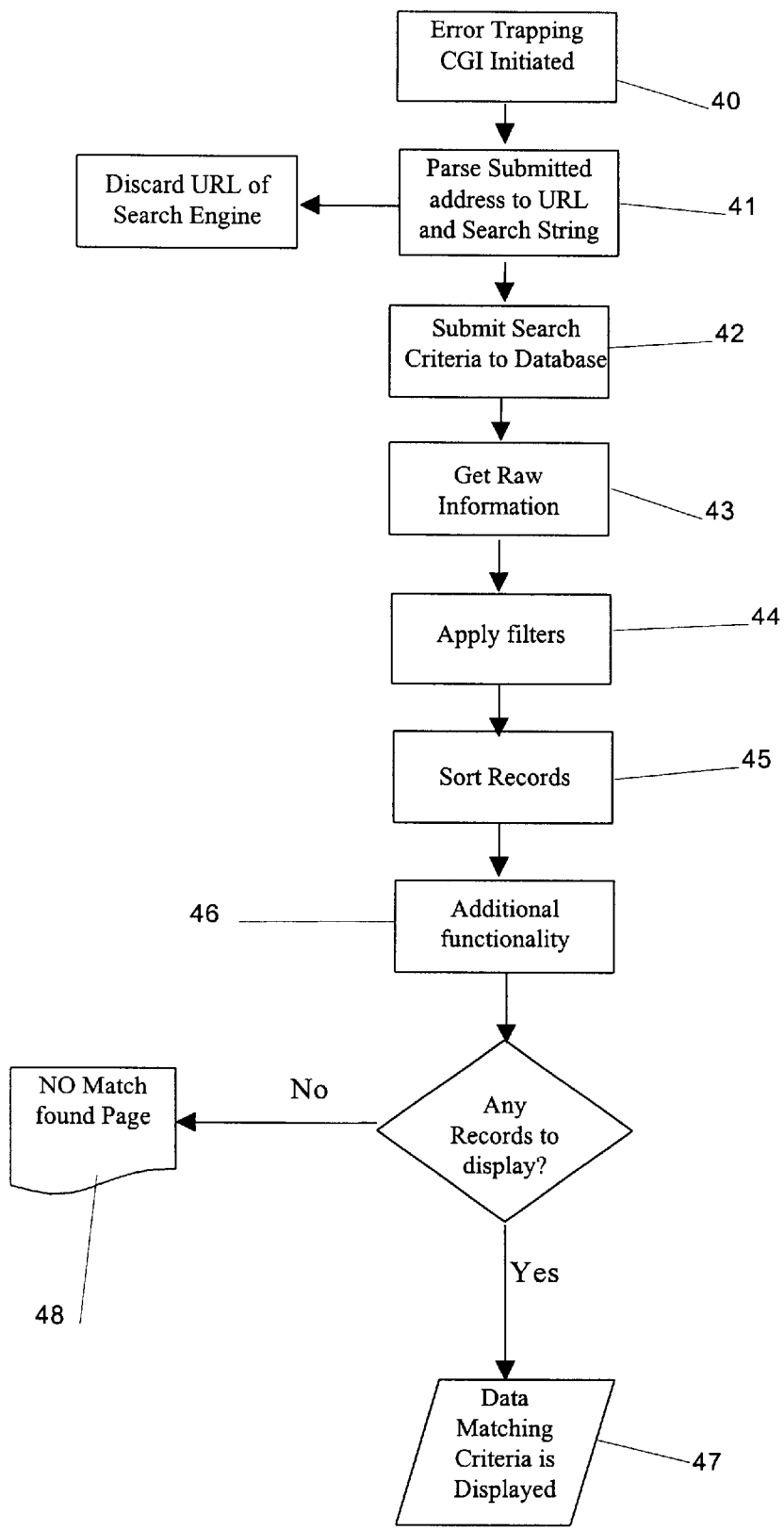
FIG. 3 is an expansion of the steps labelled 34 in FIG. 2.

FIG. 3 shows an expansion of the step labelled 34 in FIG. 2 and specifies the sub-steps involved. The central component of the present invention is the trapping of the standard error and subsequent invocation of the CGI or program and this is shown in step 40. The address submitted by the user is then parsed at step 41 so that the search string is extracted from the invalid web address entered at step 32. This is accomplished easily by dropping the search engine's URL or address e.g. www.searchengine.com to leave only the search string. The remainder of the address becomes the search string. This search string could be divided further by matching any categories that have been set up. An example would be the address "www.searchengine.com/fishing/float", which after step 41 would be "fishing/float", because the "www.searchengine.com" has been dropped. This could, for example, be refined further by splitting the string to search the category "fishing" using the criteria of "float" or by searching fishing AND float.

The search string is then submitted to the search engine at step 42. The raw results produced when the search engine interrogates its database are supplied back to the CGI or program at step 43. These unfiltered results are not made available to the user, but instead are subjected to a filtering processes 44. The filtering could be performed on the basis of any number of criteria as mentioned above, but could include limiting on the type of content, the date/time of the content, and the unsuitability of sites.

A content filter process could also include one where near matches are either included or excluded. Alternatively, whole sectors of the user community could be included or excluded according to their needs. An example of this would be the business community where, the raw results are subjected to a filtering process 44 that could exclude for example "shopping sites" and "games sites". Contrary to the case mentioned above where the user never sees the raw results, in certain circumstances the raw results could be made available, perhaps to "statistical sites" researchers. The possible filtering combinations and permutations are extensive.

Once the filtering process 44 has been completed, the records are then sorted at step 45. The parameters under which sorting could be effected are numerous and include: numerical sorting, alphabetical sorting, sorting by relevancy to the specific search and sorting by the number of visitors (or hits) to that site.

Additional functionality could be included at stage 46, and this could include further manipulation of the sorted search results or initiation of another CGI or program. This additional functionality is almost limitless in scope as any program, application or utility could in theory be plugged in to it.

Once the CGI or other program has finished the filtering and sorting of the results any matching results are supplied to the user at step 47. If no results are found, or none remain after filtering, then a "No match found" page is displayed 48.

The syntax of the search string may take any realistic form as long as the CGI or program can recognise it. Therefore different search engines could specify their own convention for the terminology to be employed. Alternatively, a common terminology could be employed across a plurality of search engines to reduce complexity and allow greater compatibility. Such a common search language would be important if the CGI or program runs as part of or hand in hand with the browser software on the user's computer.

In one possible format the address first entered in to the browser could be in the following general form:

www.searchengine.com/fishing/float/ . . .

wherein "www.searchengine.com" is the URL of the chosen search engine, and "fishing" and "float" are the desired "keywords" or search terms. " . . . " represents any further search terms that could be included. These terms could be combined using the logical operators (AND, NOT, OR) to return results that have one, either or both the keywords.

It would also be possible to use the using search method of the present invention to search for categorised information. For example to search for "fresh water fishing" a user could use the syntax www.searchengine.com/fishing/freshwater, wherein "freshwater" is a sub-classification of "fishing". Alternatively, the method could be configured such that freestyle searching is implemented, such as www.yahoo.com/fresh water fishing. The syntax could also allow for search terms to be entered in a linguistically more natural form. For example "www.searchengine.com/float fishing in the uk" could work as well as "www.searchengine.com/float/fishing/uk". All of the aforementioned formats are valid.

Also search engine owners could include provision for industry standard, or search engine specific, wild-card characters to give additional functionality. Therefore the same search conducted previously would become a search string also entered as an address "www.searchengine.com/fishing*fresh".

In FIG. 4, three different arrangements of a system for effecting a procedure according to the present invention are shown. In each of the three, arrows indicate the exchange of data or instructions between the user (or their browser) 50, and the search engine 51. Generally speaking the transfers between the two are handled by a CGI or program 52 as discussed above, but in certain circumstances it could be bypassed. Arrow 53 represents the submission of the request string to the search engine 51 (either via the CGI or directly)—or more probably web server software associated with the search engine. An error message is generated by the invalid request string and is directed back at step 54.

The error message is trapped by the CGI or program 52 which parses the request string and returns the search term or terms to the search engine at step 55. The search engine 51 conducts the search and returns the raw data to the CGI or program as indicated by arrow 56. The raw data is then sorted/filtered as appropriate and the refined data is returned to the user at 57.

Figure 4A:
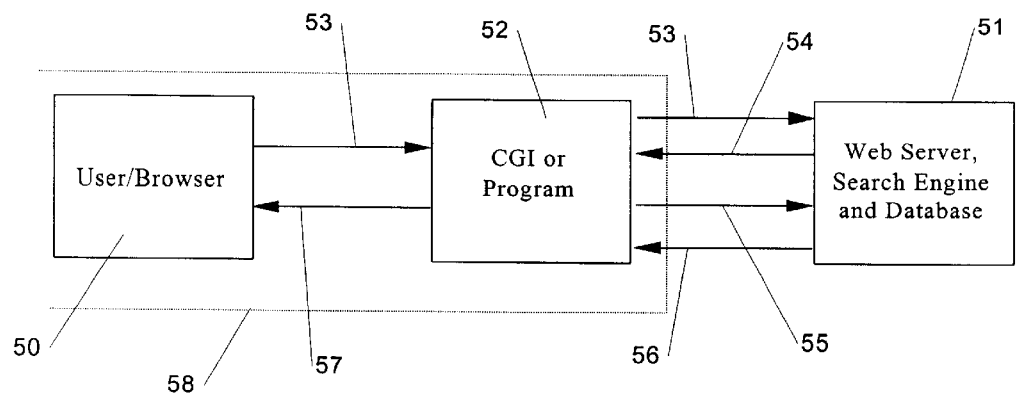

In FIG. 4A, the CGI or program forms part of the users computer (dotted line 58) and arrows 53 and 57 are communications within that computer, or indeed with a single software application. The arrows 53, 54, 55 and 56, showing communication between CGI and search engine, are through a data network such as the Internet.

Figure 4B:
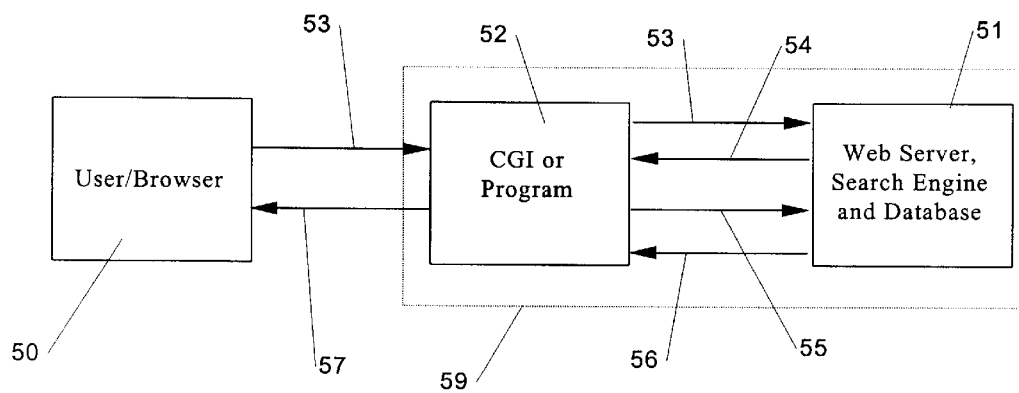

Conversely, in FIG. 4B the CGI is part of the control mechanism for the search engine (dotted line 59). In this arrangement, arrows 53 and 57 are communications through a data network such as the Internet and arrows 53, 54, 55 and 56 show communication within the computer (or software) running the search engine.

Figure 4C:
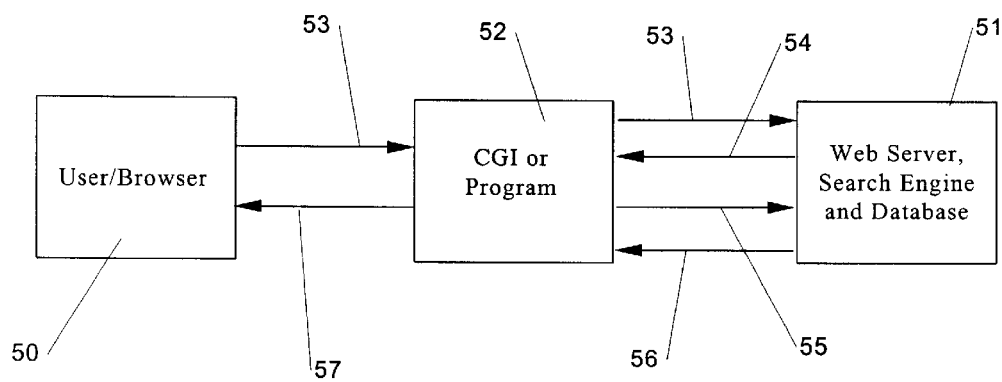

Finally in FIG. 4C the CGI 52 is running neither on the users computer nor on the search engine computer, but is acting as an intermediary between the two. All the communication arrows 54 to 57 show communication across inter-computer data networks such as the Internet.

What is claimed is:

1. A database searching procedure using a search engine associated with that database and comprising:

submitting a request string comprising a valid pointer to a specified search engine and a search string for specified data;

monitoring for the generation of an error signal, from the search engine;

using the error signal to trigger parsing of the request string into the pointer to the search engine and the search string to be searched by the search engine;

submitting the search string to the search engine; and passing at least some of the returned data returned from the search engine, back to the user.

2. A database searching procedure using a search engine associated with that database comprising:
   submitting a request string comprising the URL of the search engine and a search string for specified data comprising at least one search term;
   monitoring for the generation of an error signal from the search engine;
   using the error signal to trigger parsing of the request string into the search engine's URL and the search string;
   submitting the search string to the search engine having the specified URL; and
   passing at least some of the returned data returned from the search engine, back to the user.

3. A database searching procedure as claimed in claim 2, wherein the procedure is carried out by a program or programming steps running on computer apparatus.

4. A database searching procedure as claimed in claim 3, wherein the request string is submitted by a first computer and the database is maintained on a second computer in communication with the first computer.

5. A database searching procedure as claimed in claim 4, wherein the procedure is performed by programming steps on the first computer.

6. A database searching procedure as claimed in claim 4, wherein the procedure is performed by programming steps on the second computer.

7. A database searching procedure as claimed in claim 6, wherein the procedure is performed by programming steps forming part of the control mechanism of the search engine.

8. A database searching procedure as claimed in claim 4, wherein the procedure is performed by a third computer in the path of communication between the first and the second computers.

9. A database searching procedure as claimed in claim 2, wherein handling of the data includes at least one of sorting, filtering, forwarding, etc.

10. A database searching procedure as claimed in claim 2, wherein the search string is entered in a predetermined format.

11. A database searching procedure as claimed in claim 2, wherein a search string is entered by a user on to a computer on a computer network, the search engine is located on a different computer in the computer network, and at completion of the procedures, the results are displayed on the user's computer.

12. A database searching procedure as claimed in claim 11 wherein the computer network is the Internet or world wide web.

13. A computer-readable medium for performing the following:
   monitoring for the generation of an error signal from a search engine in response to the submission by a user of a request string comprising a valid pointer to the search engine and a search string for specified data;
   using the error signal to trigger parsing of the request string into the pointer to the search engine and the search string to be searched by the search engine;
   submitting the search string to the search engine;
   receiving data returned from the search engine; and
   passing at least some of the returned data returned from the search engine back to the user.

14. A computer-readable medium as claimed in claim 13 which also performs the additional initial step of receiving the request string submitted by the user and forwarding the request string to the search engine.

15. A computer-readable medium as claimed in claim 13 and which is configured to run on a user's local computer apparatus.

16. A computer-readable medium as claimed in claim 13 and which is configured to run on a computer installation forming a part of the search engine, or of which the search engine forms a part.

17. A set of application program interfaces embodied on a computer-readable medium for execution on a computer in conjunction with an application program that enhances searching of databases, comprising:
   a first interface that receives a request string having at least one search string and that returns an error signal with said at least one search string; and
   a second interface that re-submits just said at least one search string to a search engine database that returns a set of results to at least said second interface.

18. The set of application program interfaces according to claim 17, further comprising:
   a third interface that receives said set of results for organization according to a predetermined criteria.

19. The set of application program interfaces according to claim 18, wherein said third interface sorts said set of results according to a predetermined criteria.

20. The set of application program interfaces according to claim 19, wherein said second and third interfaces are transparent to the user submitting said request string.

21. The set of application program interfaces according to claim 17, wherein said first and second interfaces are stored on a user's computer that communicates with said search engine database.

22. The set of application program interfaces according to claim 17, wherein said first interface is stored on a user's computer and said second interface and said search engine database are stored on a data network.

23. The set of application program interfaces according to claim 17, wherein said first and second interfaces are stored on an intermediary computer that communicates with a user's computer and a data network.

* * * * *